United States Patent
Chandraiah setty Narasingarayanapeta et al.

(10) Patent No.: US 10,365,973 B2
(45) Date of Patent: *Jul. 30, 2019

(54) DATA PROFILER

(71) Applicant: NetApp Inc., Sunnyvale, CA (US)

(72) Inventors: Krishna Murthy Chandraiah setty Narasingarayanapeta, Bangalore (IN); Rakesh Bhargava M.R., Bangalore (IN); Jose Mathew, Santa Clara, CA (US)

(73) Assignee: NetApp Inc., Sunnyvale, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 15/582,839

(22) Filed: May 1, 2017

(65) Prior Publication Data

US 2017/0235644 A1    Aug. 17, 2017

Related U.S. Application Data

(63) Continuation of application No. 14/836,259, filed on Aug. 26, 2015, now Pat. No. 9,645,881.

(51) Int. Cl.
*G06F 11/00* (2006.01)
*G06F 11/14* (2006.01)
(Continued)

(52) U.S. Cl.
CPC .......... *G06F 11/1451* (2013.01); *G06F 3/065* (2013.01); *G06F 3/067* (2013.01);
(Continued)

(58) Field of Classification Search
CPC ............. G06F 11/0706; G06F 11/0754; G06F 11/079; G06F 11/1451; G06F 17/30289;
(Continued)

(56) References Cited

U.S. PATENT DOCUMENTS 7,904,466 B1    3/2011  Valencia et al.
8,176,018 B1 *  5/2012  Bisson .............. G06F 17/30144
                                                                707/690
(Continued)

OTHER PUBLICATIONS

Notice of Allowance cited in U.S. Appl. No. 14/836,259 dated Dec. 29, 2016, 7 pgs.

(Continued)

*Primary Examiner* — Joshua P Lottich
(74) *Attorney, Agent, or Firm* — Cooper Legal Group, LLC

(57) ABSTRACT

One or more techniques and/or systems are provided for profiling a dataset. For example, a snapshot of a volume may be evaluated to identify a set of data characteristics, such as file and directory size information. A baseline dataset profile of a dataset of data within the volume may be constructed based upon the set of data characteristics. Histograms and graphs of directory counts and file counts may be constructed based upon the baseline dataset profile. An incremental dataset profile may be constructed for the dataset based upon an evaluation of the snapshot and a subsequent snapshot of the volume. Histograms and graphs of directories and files that are modified, created, and/or deleted may be constructed based upon the incremental dataset profile. Performance predictions, analytics, field diagnostics of performance issues, and/or scheduling of service execution may be implemented for a storage network hosting the volume based upon dataset profiles.

20 Claims, 10 Drawing Sheets

(51) Int. Cl.
*G06F 11/07* (2006.01)
*G06F 16/21* (2019.01)
*G06F 16/22* (2019.01)
*G06F 16/27* (2019.01)
*G06F 16/335* (2019.01)
*G06F 16/901* (2019.01)
*G06F 3/06* (2006.01)

(52) U.S. Cl.
CPC .......... *G06F 3/0619* (2013.01); *G06F 3/0665* (2013.01); *G06F 11/0706* (2013.01); *G06F 11/079* (2013.01); *G06F 11/0727* (2013.01); *G06F 11/0754* (2013.01); *G06F 11/0793* (2013.01); *G06F 16/21* (2019.01); *G06F 16/22* (2019.01); *G06F 16/27* (2019.01); *G06F 16/337* (2019.01); *G06F 16/9024* (2019.01); *G06F 2201/80* (2013.01); *G06F 2201/84* (2013.01)

(58) Field of Classification Search
CPC ........... G06F 17/30312; G06F 2201/80; G06F 2201/84
See application file for complete search history.

(56) References Cited

U.S. PATENT DOCUMENTS

| 9,588,858 | B2* | 3/2017 | Wang .................. G06F 11/1662 |
| 2005/0203907 | A1* | 9/2005 | Deshmukh ........ G06F 17/30067 |
| 2011/0282843 | A1 | 11/2011 | Wang et al. |
| 2012/0054554 | A1* | 3/2012 | Dagan ................ G06F 11/0712 714/39 |
| 2012/0310890 | A1* | 12/2012 | Dodd ............... G06F 17/30073 707/646 |
| 2015/0169225 | A1 | 6/2015 | Curley et al. |
| 2018/0157860 | A1* | 6/2018 | Nair ................... G06F 21/6218 |

OTHER PUBLICATIONS

Amendment after Notice of Allowance cited in U.S. Appl. No. 14/836,259 dated Mar. 29, 2017, 8 pgs.

* cited by examiner

DATA PROFILER

RELATED APPLICATION

This application claims priority to and is a continuation of U.S. patent application Ser. No. 14/836,259, filed on Aug. 26, 2015 and titled "DATA PROFILER," which is incorporated herein by reference.

BACKGROUND

A storage network environment may provide clients with access to user data stored across one or more storage devices. For example, a cluster network environment may comprise one or more storage clusters of storage controllers (e.g., nodes) configured to provide clients with access to user data stored within storage devices. Various data management services may be implemented for the storage network environment, such as backup and restore functionality, replication functionality, snapshot functionality, dump commands, etc. Performance of such services may depend on factors such as characteristics of a dataset upon which a data management service is operating. For example, file sizes, directory sizes, numbers of files, numbers of directories, data changes (e.g., files and directories of a volume that are added, removed, or modified since a prior snapshot of a volume), and/or a variety of other characteristics of the dataset may affect performance of a replication data management service.

Data management services may utilize computing resources and bandwidth of the storage network environment for operation. For example, the replication data management service may be hosted on a storage controller, and may be configured to send data over a network to a second storage controller for data replication. Inefficient operation of data management services due to characteristics of datasets may degrade performance of users accessing data through the storage network environment. For example, the storage controller may have inadequate computing resources and/or bandwidth available for processing client I/O requests to data because the storage controller is executing the replication data management service. Unfortunately, a client, for which the storage network environment is maintained, may be unable to provide an administrator of the storage network environment with a clear view of a profile of the dataset, and thus the administrator may be unable to diagnose the degraded performance.

DETAILED DESCRIPTION

Figure 1:
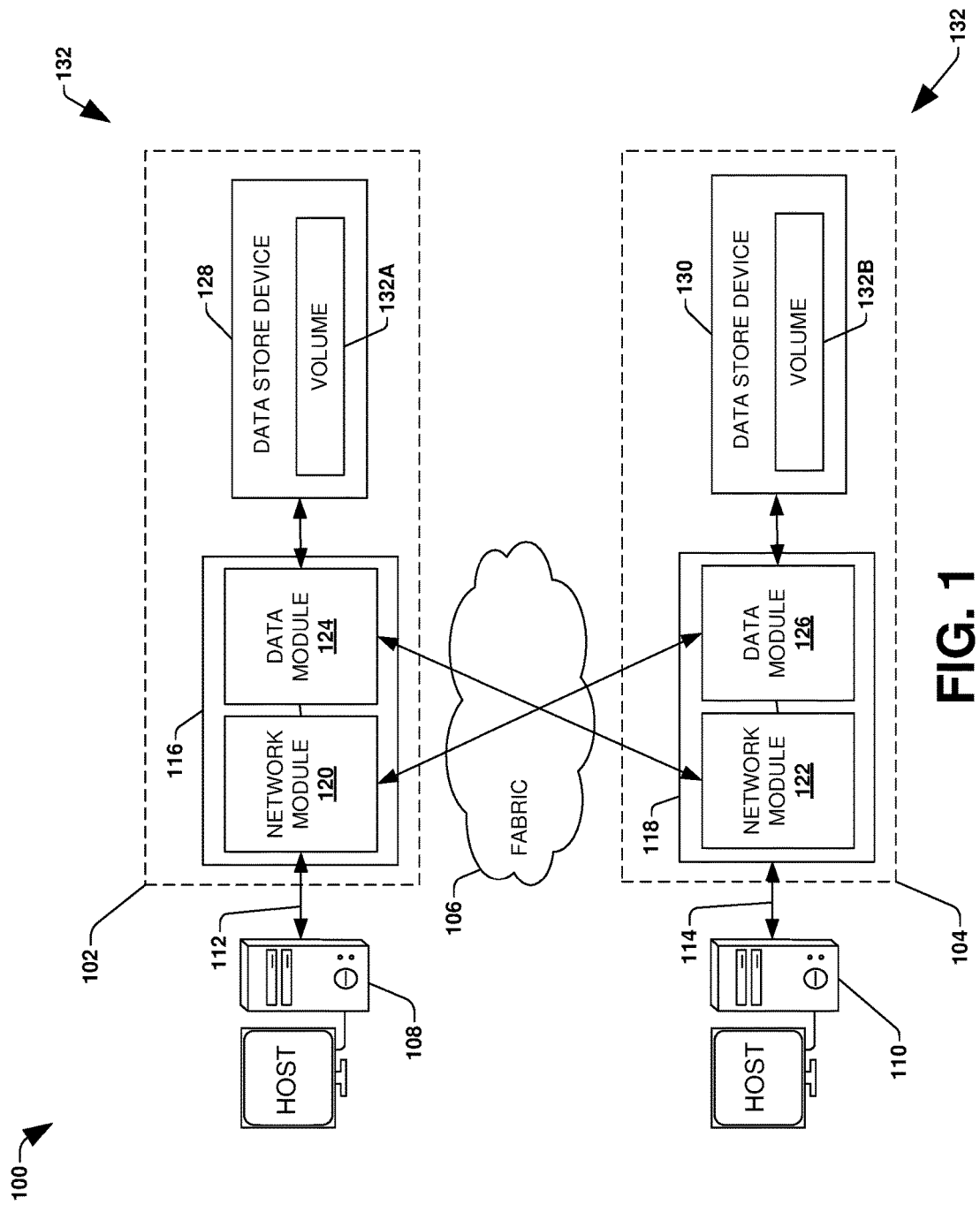
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more systems and/or techniques for profiling a dataset are provided. A dataset profiler may be configured to evaluate snapshots of a volume for creating a baseline dataset profile and/or incremental dataset profiles (e.g., changes to the volume since the baseline dataset profile was created). In an example, the dataset profiler may evaluate a snapshot of the volume to identify a set of data characteristics, such as file size information and directory size information, for constructing a baseline dataset profile of a dataset of data within the volume. In another example, the dataset profiler may evaluate the snapshot and a second snapshot of the volume (e.g., a subsequent snapshot at a later point in time from when the snapshot was captured) to identify a second set of data characteristics, corresponding to differences between the snapshot and the second snapshot, for constructing an incremental dataset profile of the dataset.

Dataset profiles may be used for various purposes within a data storage environment. In an example, histograms of file sizes and directory sizes, a graph of directory counts, and/or a graph of file counts may be constructed from the baseline dataset profile. Histograms of file sizes and/or directory sizes that are modified, created, and/or deleted may be constructed based upon the incremental dataset profile. In another example, a dataset profile may be used to better understand client workloads and what types of data is produced by such workloads (e.g., files sizes, directory structures, directory depth, number of directory entries, etc.). In another example, diagnosis of performance issues within the data storage environment may be efficiently performed using a dataset profile because the dataset profile may specify file sizes, directory sizes, and/or other data characteristics that may be indicative of whether performance of a service may be affected by such data characteristics (e.g., a replication service may perform slower when replicating a large number of small modified files as opposed to a small number of large files), and thus services such as the replication service may be efficiently scheduled (e.g., slower and/or resource intensive services may be scheduled for execution by a storage controller during periods of low client load on the storage controller). In another example, a dataset profile may be evaluated to detect violations of recommendations (e.g., file size recommendations, file location recommendations, etc.) and/or service level objectives (e.g., a client I/O latency violation due to a service operating on a type of data that hinders performance of the service). In another example, modification percentage and modified file block number (FBN) ranges in files may be reported based upon a data profile. In this way, advanced analytics may be performed on the dataset, such as to determine how services may affect client access performance to data managed by the data storage network (e.g., a determination that a replication service may expend additional resources of a storage controller to perform a replication due to particular characteristics of files and/or directories, and thus the storage controller may provide slower client I/O processing).

To provide context for profiling a dataset, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that profiling a dataset may be implemented within the clustered network environment 100. For example, a data profiler component may be implemented for the node 116 and/or the node 118. The data profiler component may be configured to evaluate snapshots of the volume 132A and/or the volume 132B to construct dataset profiles of data within such volumes. In may be appreciated that profiling a dataset may be implemented for and/or between any type of computing environment, and may be transferrable between physical devices (e.g., node 116, node 118, etc.) and/or a cloud computing environment (e.g., remote to the clustered network environment 100).

Figure 2:
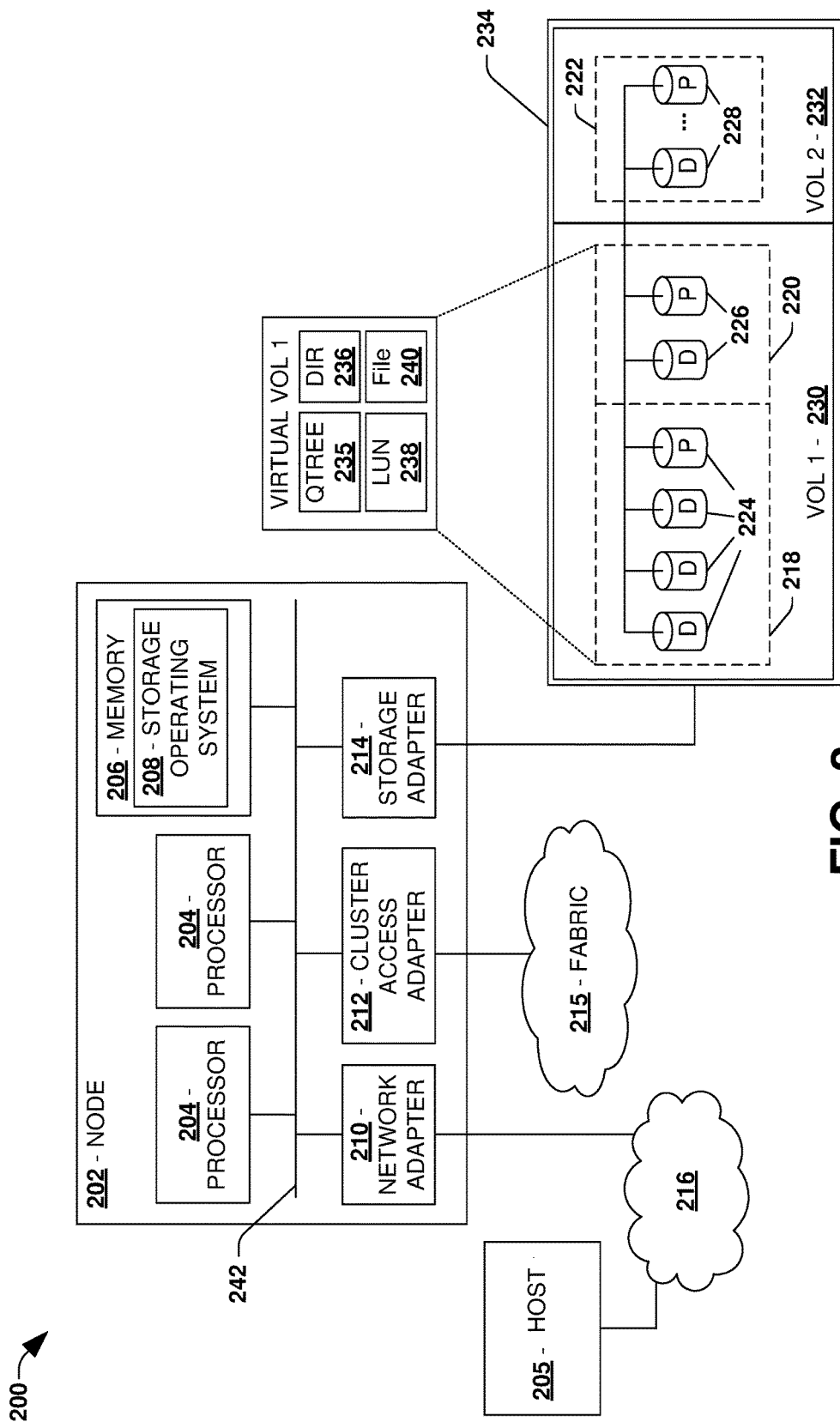
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that profiling a dataset may be implemented for the data storage system 200. For example, a data profiler component may be implemented for the node 202. The data profiler component may be configured to evaluate snapshots of the volume 230 and/or the volume 232 to construct dataset profiles of data within such volumes. In may be appreciated that profiling a dataset may be implemented for and/or between any type of computing environment, and may be transferrable between physicals devices (e.g., node 202, another node associated with the data storage system 200, etc.) and/or a cloud computing environment (e.g., remote to the data storage system 200).

Figure 3:
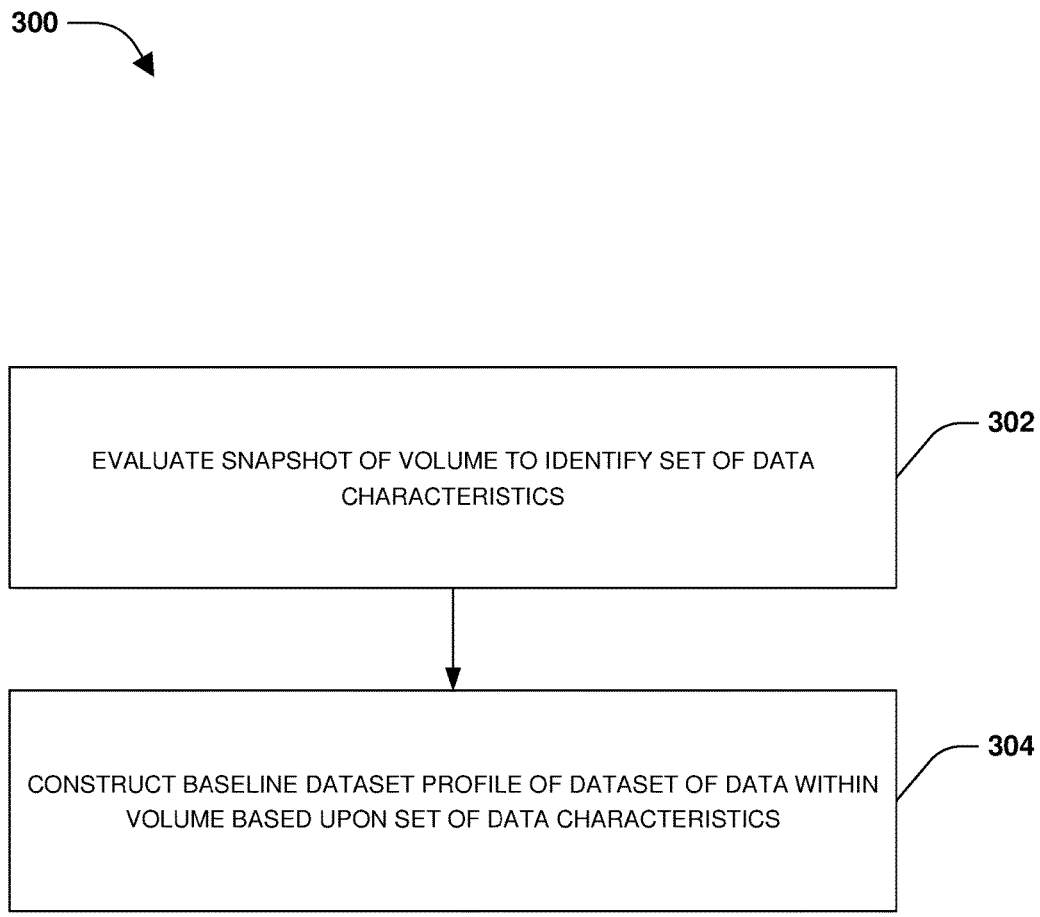
FIG. 3 is a flow chart illustrating an exemplary method of profiling a dataset.

One embodiment of profiling a dataset is illustrated by an exemplary method 300 of FIG. 3. At 302, a snapshot of a volume (e.g., a point in time representation of the volume) may be evaluated (e.g., utilizing a snapshot difference tool, such as a snapshot difference API that is invoked using a volume identifier of the volume and the snapshot as arguments) to identify a set of data characteristics. The set of data characteristics may comprise file size information, directory size information, file count information, directory count information, a number of inodes, a size of inodes, and/or other data characteristics.

At 304, a baseline dataset profile of a dataset of data within the volume may be constructed based upon the set of data characteristics. The baseline dataset profile may specify file counts, files sizes, directory counts, directory sizes, and/or other information. In an example, a histogram of file sizes and directory sizes of the dataset may be constructed based upon the baseline dataset profile. In another example, a graph of directory counts may be constructed (e.g., counts of directories having certain sizes or other characteristics such as numbers of files or subdirectories comprised therein). In another example, a graph of file counts may be constructed (e.g., counts of files having certain sizes).

In an example of creating dataset profiles, the snapshot and a second snapshot of the volume (e.g., the second snapshot corresponding a second point in time representation of the volume that is subsequent to the point in time representation of the volume within the snapshot) may be evaluated (e.g., utilizing the snapshot difference tool, such as the snapshot difference API to loop through the snapshots for identifying differences) to identify a second set of data characteristics corresponding to differences between the snapshot and the second snapshot. The second set of data characteristics may comprise directory creation information, directory deletion information, directory modification information, file creation information, file deletion information, file modification information, and/or other information regarding differences in the dataset of the volume from the point in time of the snapshot and the second point in time of the second snapshot. In this way, an incremental dataset profile of the dataset may be constructed based upon the second set of data characteristics. Histograms and/or graphs of files of certain sizes that are modified, created, and/or deleted may be constructed based upon the incremental dataset profile. Histograms and/or graphs of directory of certain sizes that are modified, created, and/or deleted may be constructed based upon the incremental dataset profile.

In an example, a data management performance issue of a data storage environment may be identified based upon the baseline dataset profile and/or the incremental dataset profile. For example, a dataset profile may indicate that the dataset comprises a large number of small modified files dispersed amongst a large number of nested directories. A corrective action may be implemented for the data management performance issue (e.g., a user may be notified of the data management performance issue; a volume resize suggestion may be provided so that a volume does not exceed a recommended volume size; a replication service may be scheduled for time period where additional resources are available; etc.). A replication service, hosted on a storage controller of the data storage environment, may execute longer and/or consume more resources of the storage controller when attempting to replicate such a dataset as compared to datasets having other characteristics, and thus the storage controller may provide degraded performance for servicing client I/O requests. In this way, a backup command, a replication command, and/or other services may be scheduled based upon the dataset profile, such as where the replication service is scheduled to execute overnight when the storage controller handles a low volume of client I/O requests.

In an example, the baseline dataset profile and/or the incremental dataset profile may be evaluated to identify a service level objective violation of a data management function operating on the dataset. For example, a service level objective may specify a threshold amount of time before a disaster during which data is allowed to be lost. A write caching replication service for replicating cached data of the volume between storage controllers may be unable to achieve the service level object because the dataset, which is indicative of types of data cached and flushed to the volume during consistency points, may have a data profile that increases job execution time of the write caching replication service. Thus, a notification of the service level objective violation may be provided to a storage administrator or client.

In another example, the baseline dataset profile and/or the incremental dataset profile may be evaluated to prevent a Quality of Service (QoS) false alarm (e.g., a dataset profiler component may be executed through a QoS background class such that the dataset profiler component may yield of other threads and workloads in the event of a contention for resources). In another example, the baseline dataset profile and/or the incremental dataset profile may be evaluated to identify a data management recommendation violation. The data management recommendation violation may correspond to a file location violation, a logical unit number (LUN) location violation, a volume size violation, a directory size violation, a file size violation, a file count violation, a directory count violation, and/or other violations of recommendations for managing storage of the network storage environment.

In an example, construction of baseline dataset profiles and/or incremental dataset profiles may be performed on-demand in response to on-demand data profile commands. In another example, a profile creation schedule, for creating dataset profiles over time, may be implemented. In this way, dataset profiles may be created and/or evaluated for performance prediction, efficient field diagnosis of performance issues, analytical evaluation of how data is structures and stored, scheduled maintenance of backups, detection of recommendation violations, mitigation of false alarms from QoS, etc.

Figure 4:
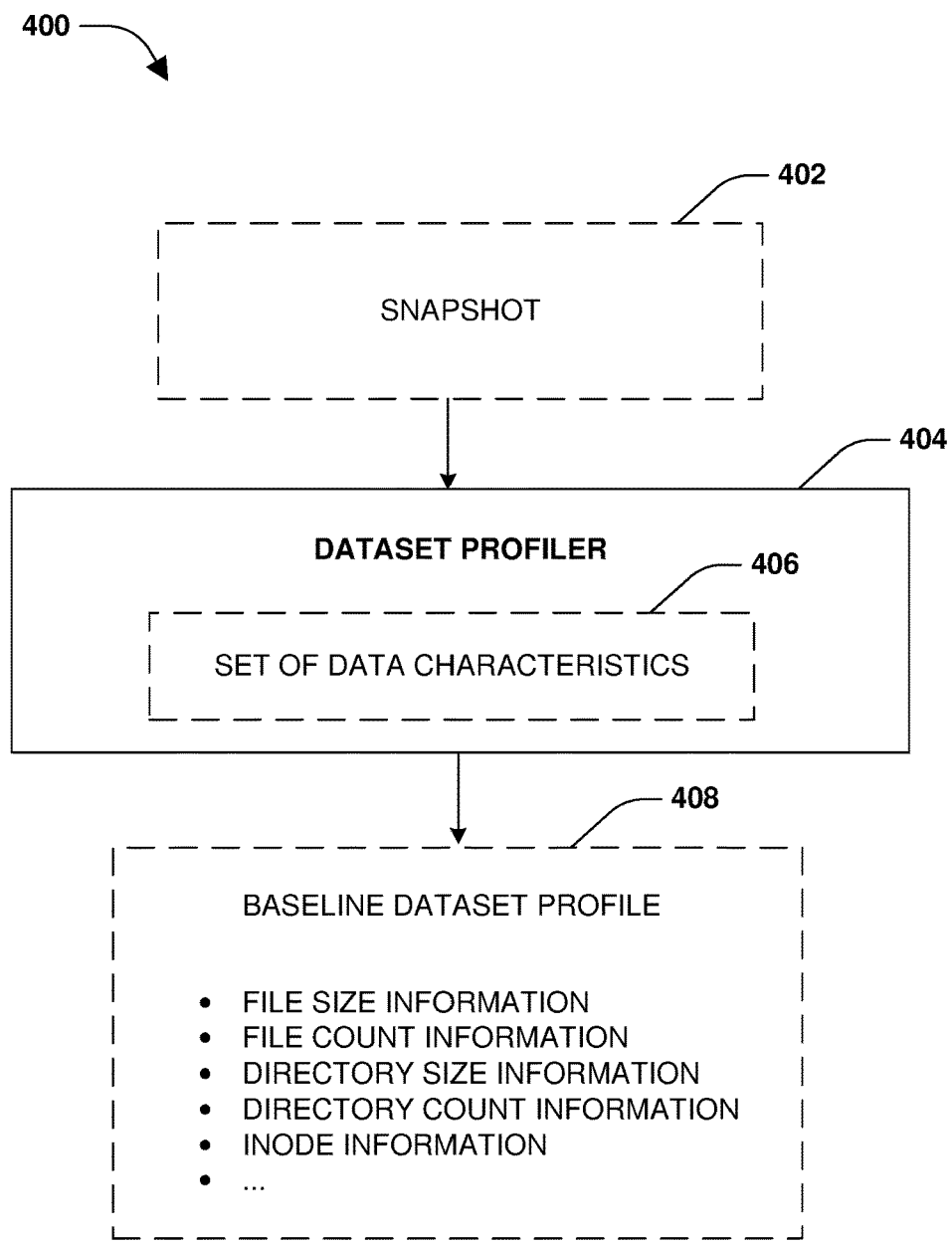
FIG. 4 is a component block diagram illustrating an exemplary system for profiling a dataset to create a baseline dataset profile.

FIG. 4 illustrates an example of a system 400 for profiling a dataset. The system 400 comprises a dataset profiler component 404. The dataset profiler component 404 may be configured to evaluate a snapshot 402 of a volume, such as a point in time representation of the volume. The dataset profiler component 404 may evaluate the snapshot 402 (e.g., using a snapshot difference API) to identify a set of data characteristics 406 comprising file size information, directory size information, and/or other information about the volume and data stored therein. The dataset profiler component 404 may construct a baseline dataset profile 408 based upon the set of data characteristics 406. The baseline dataset profile 408 may specify file size information, file count information, directory size information, directory count information, inode information, etc.

Figure 5:
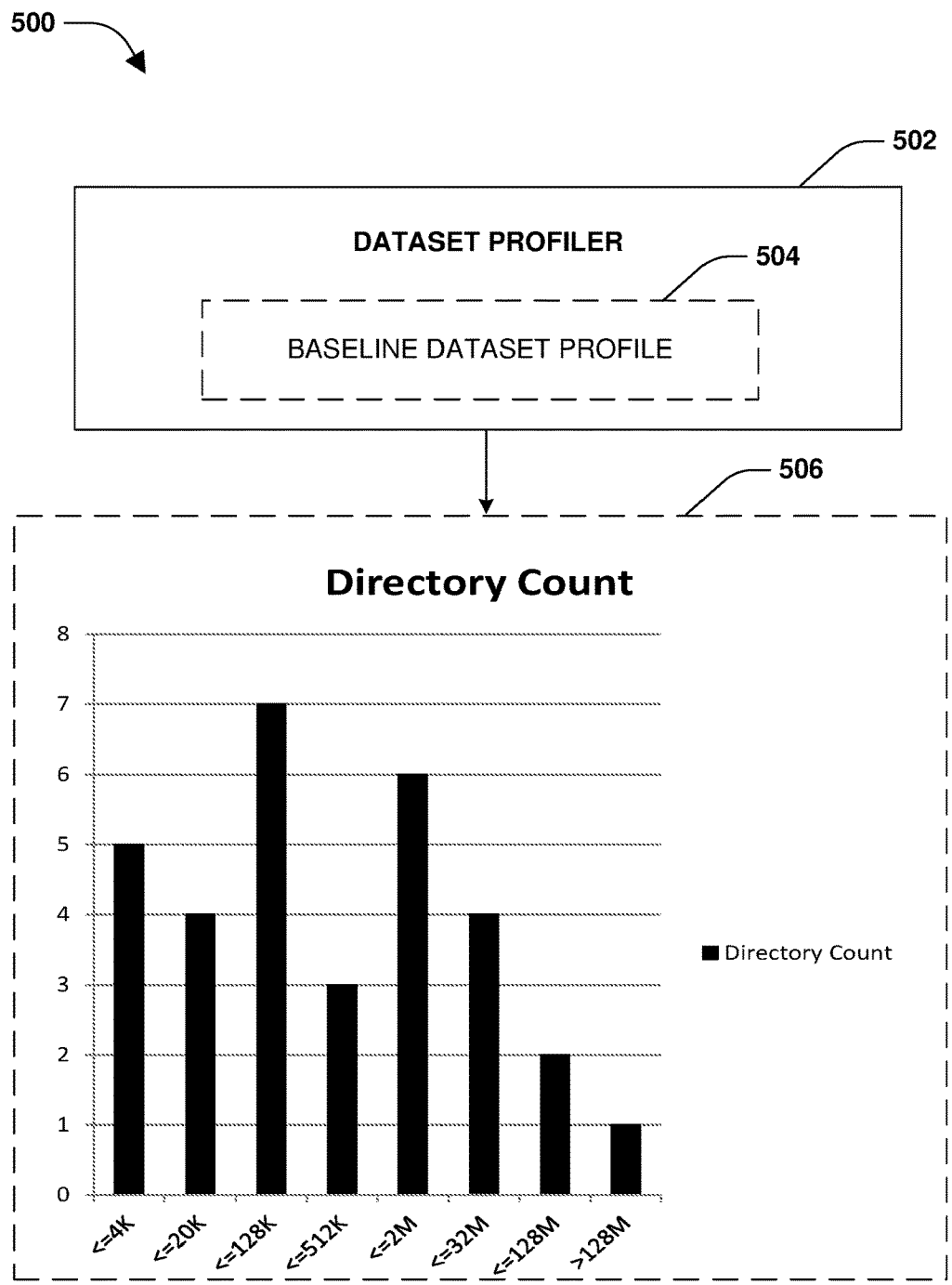
FIG. 5 is a component block diagram illustrating an exemplary system for profiling a dataset to create a graph of directory counts.

FIG. 5 illustrates an example of a system 500 for profiling a dataset. The system 500 comprises a dataset profiler component 502. The dataset profiler component 502 may have constructed a baseline dataset profile 504 of a volume. The dataset profiler component 502 may construct a graph 506 of directory counts of the volume based upon the baseline dataset profile 504. The graph 506 may comprise an x-axis representing directory sizes and a y-axis representing counts of directories having particular directory sizes (e.g., 5 directories of the volume may have sizes equal to 4K or less; 1 directory of the volume may have a size of 128 M or greater; etc.).

Figure 6:
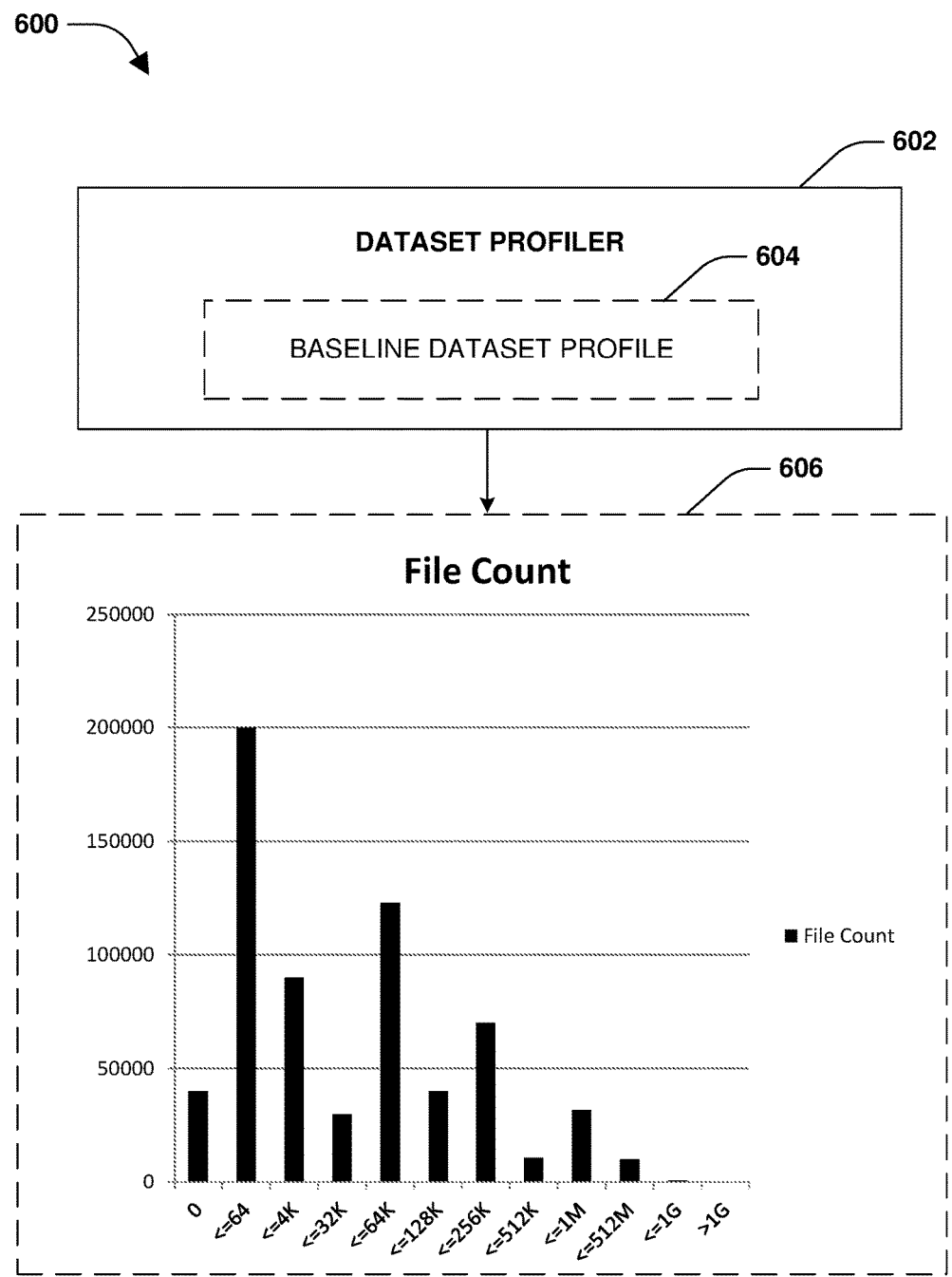
FIG. 6 is a component block diagram illustrating an exemplary system for profiling a dataset to create a graph of file counts.

FIG. 6 illustrates an example of a system 600 for profiling a dataset. The system 600 comprises a dataset profiler component 602. The dataset profiler component 602 may have constructed a baseline dataset profile 604 of a volume. The dataset profiler component 602 may construct a graph 606 of file counts of the volume based upon the baseline dataset profile 604. The graph 606 may comprise an x-axis representing file sizes and a y-axis representing counts of files having particular file sizes (e.g., 200,000 files may have file sizes between 0 and 64 bytes).

Figure 7:
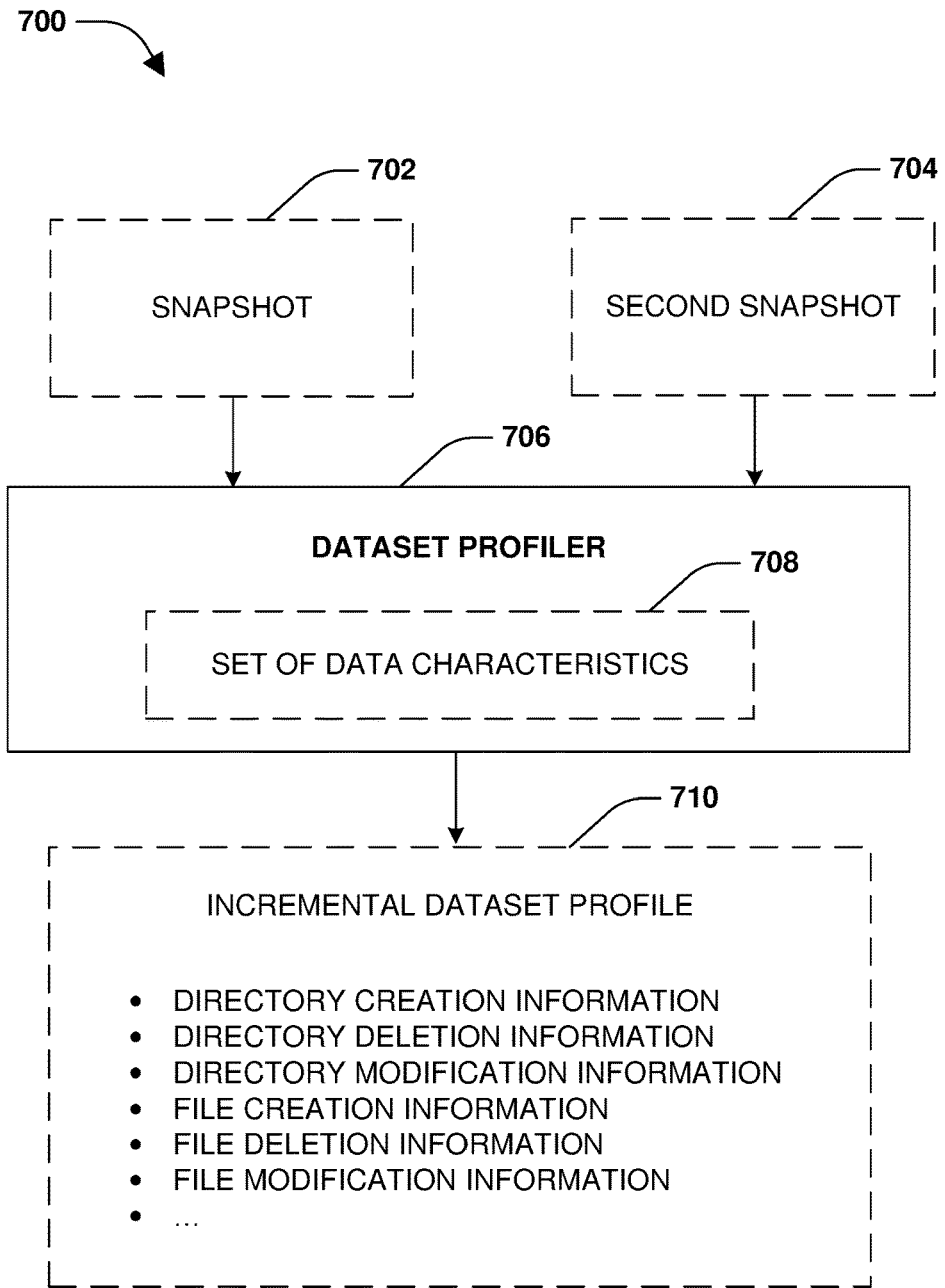
FIG. 7 is a component block diagram illustrating an exemplary system for profiling a dataset to create an incremental dataset profile.

FIG. 7 illustrates an example of a system 700 for profiling a dataset. The system 700 comprises a dataset profiler component 706. The dataset profiler component 706 may be configured to evaluate a snapshot 702 of a volume, such as a point in time representation of the volume, and a second snapshot 704 of the volume, such as a subsequent point in time representation of the volume. The dataset profiler component 706 may evaluate the snapshot 702 and the second snapshot 704 to identify a set of data characteristics 708 corresponding to differences between the snapshot 702 and the second snapshot 704 and/or other information about the volume and data stored therein. The dataset profiler component 706 may construct an incremental dataset profile 710 based upon the set of data characteristics 709. The incremental dataset profile 710 may specify directory creation information, directory deletion information, directory modification information, file creation information, file deletion information, file modification information, and/or other information relating to size and count differences of data of the volume between the point in time at which the snapshot 702 was captured and the subsequent point in time at which the second snapshot 704 was captured.

Figure 8:
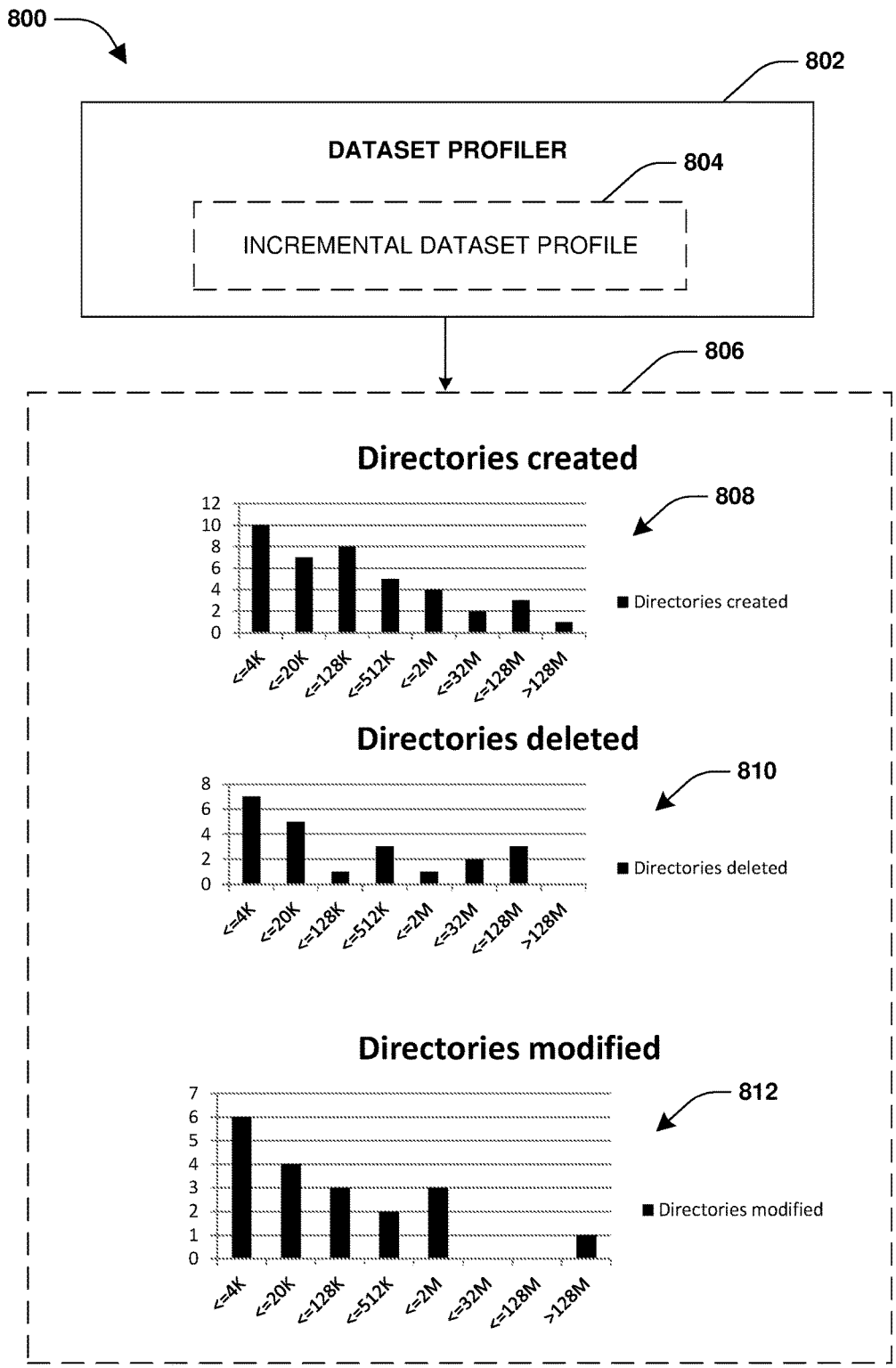
FIG. 8 is a component block diagram illustrating an exemplary system for profiling a dataset to create a set of directory graphs.

FIG. 8 illustrates an example of a system 800 for profiling a dataset. The system 800 comprises a dataset profiler component 802. The dataset profiler component 802 may have constructed an incremental dataset profile 804 of a volume. The dataset profiler component 802 may construct graphs 806, such as a directory creation graph 808, a directory deletion graph 810, and a directory modified graph 812, based upon the incremental dataset profile 804. The directory creation graph 808 may comprise an x-axis representing directory sizes and a y-axis representing counts of directories, having particular directory sizes, that were created (e.g., 10 new directories, having sizes equal to 4K or less, were created between a point in time of a snapshot of the volume and a subsequent point in time of a second snapshot of the volume). The directory deletion graph 810 may comprise an x-axis representing directory sizes and a y-axis representing counts of directories, having particular directory sizes, that were deleted (e.g., 7 directories, having sizes equal to 4K or less, were deleted between the point in time and the subsequent point in time of the volume). The directory modification graph 812 may comprise an x-axis representing directory sizes and a y-axis representing counts of directories, having particular directory sizes, that were modified (e.g., 6 directories, having sizes equal to 4K or less, were modified between the point in time and the subsequent point in time of the volume).

Figure 9:
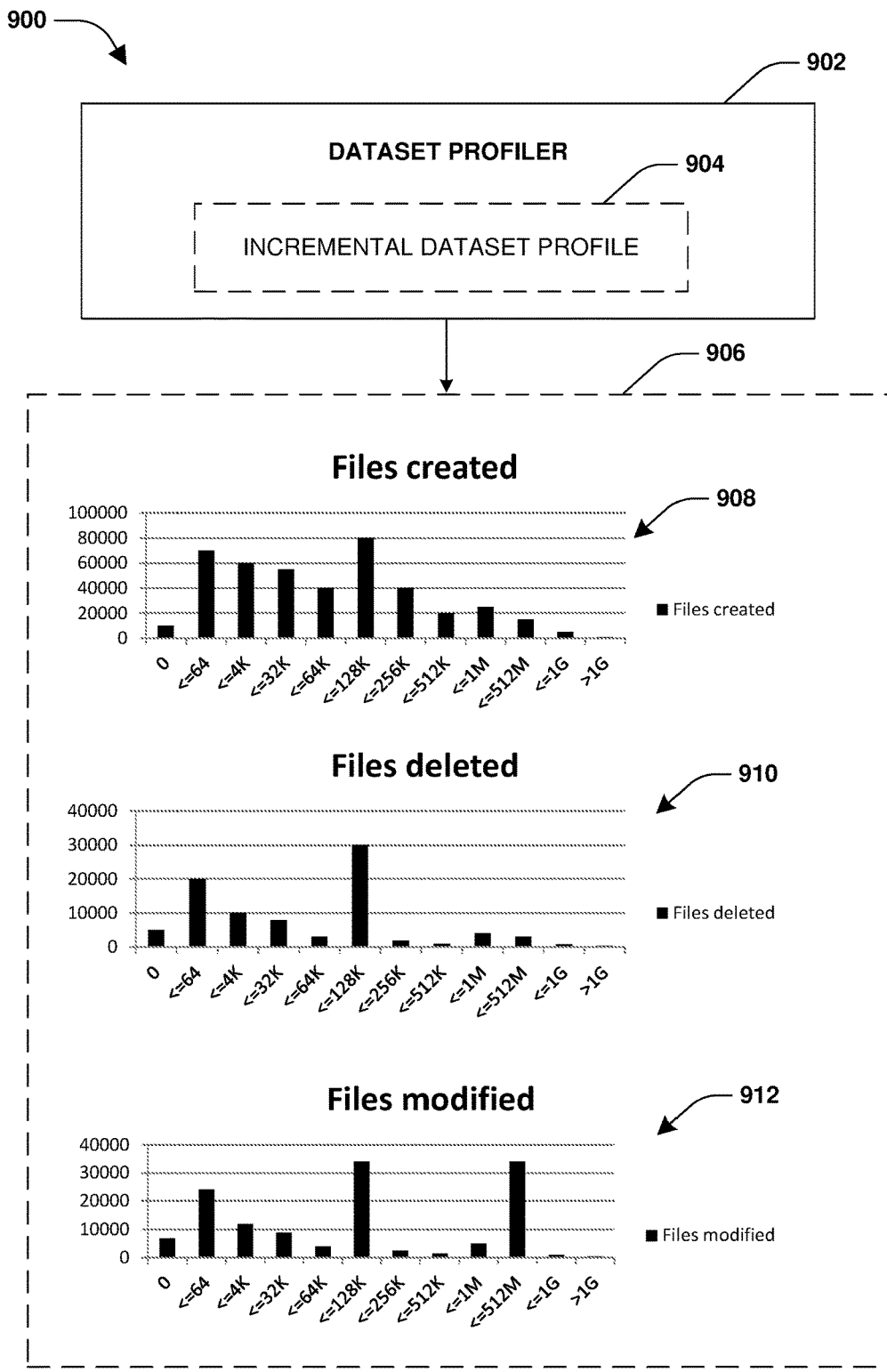
FIG. 9 is a component block diagram illustrating an exemplary system for profiling a dataset to create a set of file graphs.

FIG. 9 illustrates an example of a system 900 for profiling a dataset. The system 900 comprises a dataset profiler component 902. The dataset profiler component 902 may have constructed an incremental dataset profile 904 of a volume. The dataset profiler component 902 may construct graphs 906, such as a file creation graph 908, a file deletion graph 910, and a file modified graph 912, based upon the incremental dataset profile 904. The file creation graph 908 may comprise an x-axis representing file sizes and a y-axis representing counts of files, having particular file sizes, that were created (e.g., 9,000 new files, having sizes equal to 0 bytes, were created between a point in time of a snapshot of the volume and a subsequent point in time of a second snapshot of the volume). The file deletion graph 910 may comprise an x-axis representing file sizes and a y-axis representing counts of files, having particular file sizes, that were deleted (e.g., 5,000 files, having sizes equal to 0 bytes, were deleted between the point in time and the subsequent point in time of the volume). The file modification graph 912 may comprise an x-axis representing file sizes and a y-axis representing counts of files, having particular file sizes, that were modified (e.g., 7,000 files, having sizes equal to 0 bytes, were modified between the point in time and the subsequent point in time of the volume).

Figure 10:
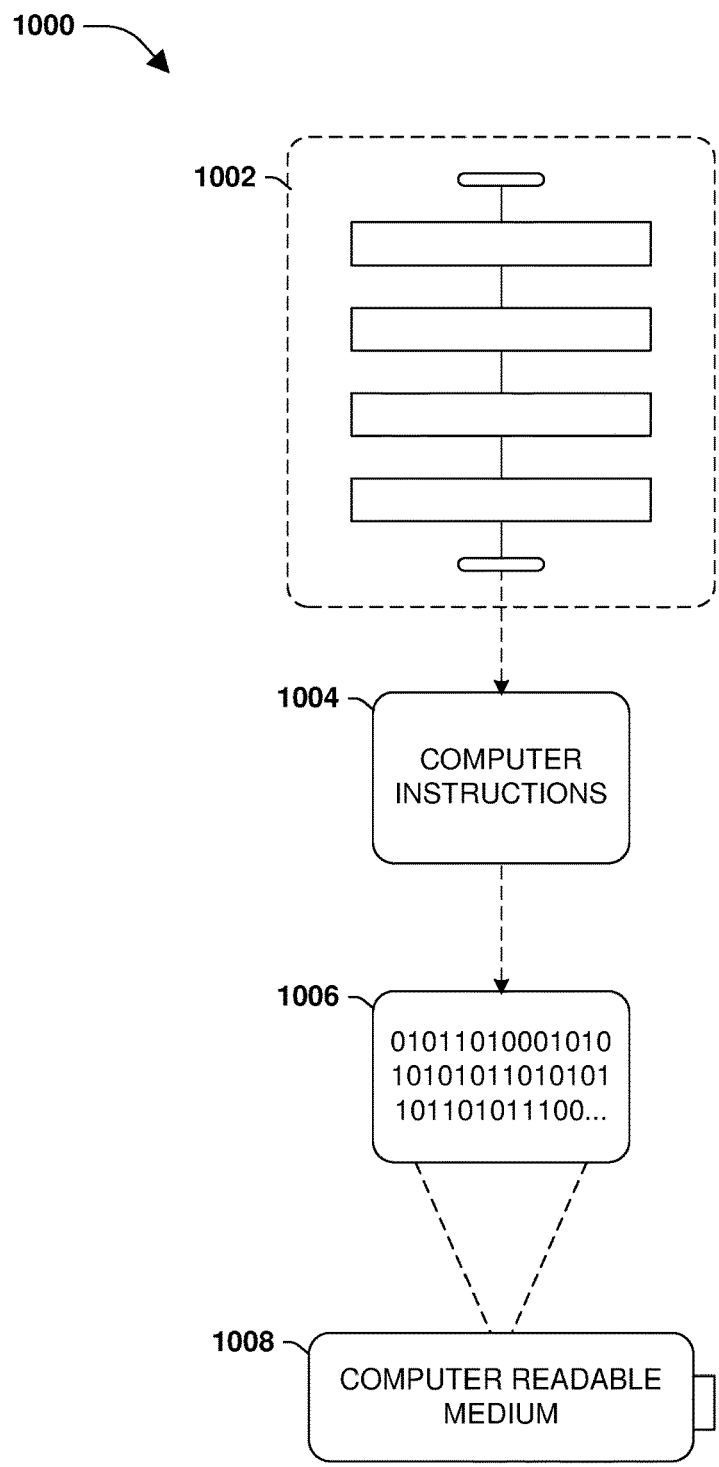
FIG. 10 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 10, wherein the implementation 1000 comprises a computer-readable medium 1008, such as a CD-R, DVD-R, flash drive, a platter of a hard disk drive, etc., on which is encoded computer-readable data 1006. This computer-readable data 1006, such as binary data comprising at least one of a zero or a one, in turn comprises a set of computer instructions 1004 configured to operate according to one or more of the principles set forth herein. In some embodiments, the processor-executable computer instructions 1004 are configured to perform a method 1002, such as at least some of the exemplary method 300 of FIG. 3, for example. In some embodiments, the processor-executable instructions 1004 are configured to implement a system, such as at least some of the exemplary system 400 of FIG. 4, at least some of the exemplary system 500 of FIG. 5, at least some of the exemplary system 600 of FIG. 6, at least some of the exemplary system 700 of FIG. 7, at least some of the exemplary system 800 of FIG. 8, and/or at least some of the exemplary system 900 of FIG. 9, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    evaluating, by a computing device, a snapshot of a volume to identify a set of data characteristics comprising file size information and directory size information;
    constructing a baseline dataset profile of a dataset of data within the volume based upon the set of data characteristics; and
    constructing a first histogram of file sizes and directory sizes of the dataset based upon the baseline dataset profile.

2. The method of claim 1, comprising:
    constructing a second histogram of file sizes that are modified, created, and deleted based upon an incremental dataset profile of the dataset, wherein the incremental dataset profile is derived from a second set of a characteristics corresponding to differences between the snapshot and a second snapshot of the volume.

3. The method of claim 1, comprising:
    constructing a second histogram of directory sizes that are modified, created, or deleted based upon an incremental dataset profile of the dataset, wherein the incremental dataset profile is derived from a second set of a characteristics corresponding to differences between the snapshot and a second snapshot of the volume.

4. The method of claim 1, comprising:
    constructing a graph of directory counts based upon the baseline dataset profile.

5. The method of claim 1, comprising:
    constructing a graph of file counts based upon the baseline dataset profile.

6. The method of claim 1, comprising:
evaluating the baseline dataset profile to identify a service level objective violation of a data management service operating on the dataset.

7. The method of claim 1, comprising:
evaluating the baseline dataset profile to identify a quality of service false alarm.

8. A non-transitory machine readable medium comprising machine executable code which when executed by a machine, causes the machine to:
evaluate a snapshot of a volume to identify a set of data characteristics comprising file size information and directory size information;
construct a baseline dataset profile of a dataset of data within the volume based upon the set of data characteristics; and
construct a first graph of directory counts based upon the baseline dataset.

9. The non-transitory machine readable medium of claim 8, wherein the machine executable code causes the machine to:
construct a second graph of file counts based upon the baseline dataset profile.

10. The non-transitory machine readable medium of claim 8, wherein the machine executable code causes the machine to:
construct a histogram of file sizes and directory sizes of the dataset based upon the baseline dataset profile.

11. The non-transitory machine readable medium of claim 8, wherein the machine executable code causes the machine to:
construct an incremental dataset profile of the dataset based upon a second set of data characteristics corresponding to differences between the snapshot and a second snapshot of the volume.

12. The non-transitory machine readable medium of claim 11, wherein the second set of data characteristics correspond to directory creation information, directory deletion information, and directory modification information.

13. The non-transitory machine readable medium of claim 11, wherein the second set of data characteristics correspond to file creation information, file deletion information, and file modification information.

14. A computing device, comprising:
a memory comprising machine executable code; and
a processor coupled to the memory, the processor configured to execute the machine executable code to cause the processor to:
evaluate a snapshot of a volume to identify a set of data characteristics comprising file size information and directory size information;
construct a baseline dataset profile of a dataset of data within the volume based upon the set of data characteristics; and
construct a first graph of file counts based upon the baseline dataset profile.

15. The computing device of claim 14, wherein the machine executable code causes the processor to:
construct a histogram of file sizes and directory sizes of the dataset based upon the baseline dataset profile.

16. The computing device of claim 14, wherein the set of data characteristics comprises a number of inodes and a size of inodes associated with the volume.

17. The computing device of claim 14, wherein the machine executable code causes the processor to:
construct an incremental dataset profile of the dataset based upon a second set of data characteristics corresponding to differences between the snapshot and a second snapshot of the volume.

18. The computing device of claim 14, wherein the machine executable code causes the processor to:
construct a second graph of directory counts based upon the baseline dataset.

19. The computing device of claim 14, wherein the machine executable code causes the processor to:
evaluate the baseline dataset profile to identify a data management recommendation violation.

20. The computing device of claim 14, wherein the machine executable code causes the processor to:
notify a user of the data management recommendation violation.

* * * * *